Figure 1:
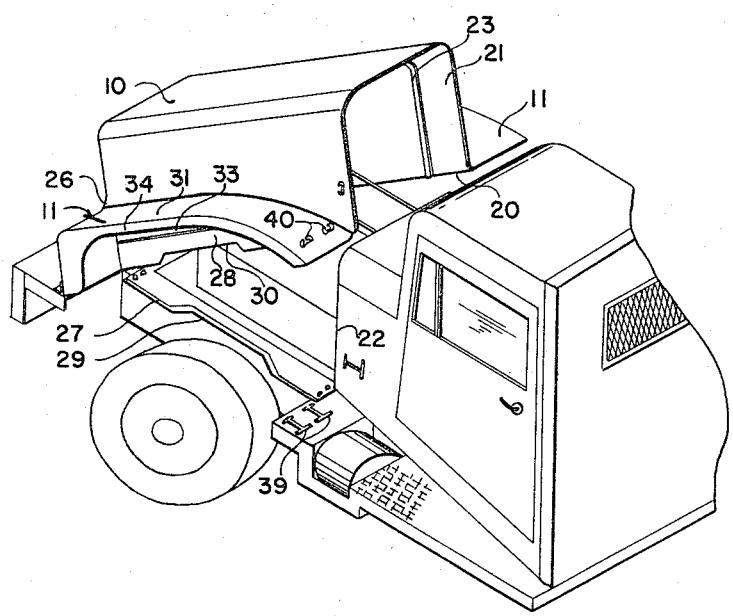

Aug. 29, 1967   G. E. HAFER ET AL   3,338,326
AUTOMOTIVE VEHICLE HOOD AND FENDER ASSEMBLY
Filed July 16, 1964   2 Sheets-Sheet 1

INVENTOR.
GEORGE E. HAFER
CHARLES S. WILLIS
BY
ATTORNEYS

Aug. 29, 1967  G. E. HAFER ET AL  3,338,326
AUTOMOTIVE VEHICLE HOOD AND FENDER ASSEMBLY
Filed July 16, 1964  2 Sheets-Sheet 2

INVENTOR.
GEORGE E. HAFER
CHARLES S WILLIS
BY Mallinckrodt and
Mallinckrodt
ATTORNEYS United States Patent Office 3,338,326
Patented Aug. 29, 1967

3,338,326
AUTOMOTIVE VEHICLE HOOD AND FENDER
ASSEMBLY
George E. Hafer and Charles S. Willis, Salt Lake City,
Utah, assignors, by mesne assignments, to Ibex Motor
Truck Corp., Salt Lake City, Utah, a corporation of
Utah
Filed July 16, 1964, Ser. No. 383,133
4 Claims. (Cl. 180—69)

This invention relates to automotive vehicle hood and fender assemblies and is especially concerned with such assemblies used on trucks of the type having a frame-supported engine compartment requiring a covering hood, and adjacent steerable wheels requiring the protective wheel pockets formed by fenders.

In order for a truck to carry a maximum payload for the power available, the hood and fenders, as well as the other structural components, must be as light in weight as possible.

Accordingly, a principal object of the present invention is to provide a hood and fender assembly of lightweight material, such as resin-impregnated fabric made from glass fibers, with the reinforcement required to give necessary rigidity to the assembly being constructed of the same material and formed integral with the hood and fenders.

It is also an object to insure that the under hood and under fender components of the vehicle are readily and completely accessible, and that the destructive stresses normally developed in the lightweight hood and fenders are kept to a minimum.

In U.S. Patent No. 3,017,944, issued Jan. 23, 1962, to R. C. Norrie, a forward pivoting, unitary, vehicle hood and fender assembly constructed of fiber glass is shown. We have found this unitary type construction to be unsatisfactory for many types of vehicles, however, especially for trucks used largely for operations such as power wire stringing, oil production, and construction work, where their travel is largely off-highway and over very rugged terrain. Such travel results in a great deal of lateral twisting, i.e. racking, of the vehicle. The stresses developed during this racking are transmitted to the hood and fenders, as well as to the vehicle frame and cab.

It has been our experience that, when the hood and fenders of an automotive vehicle are of unitary construction, and one front wheel drops sharply below the level of the other front wheel, for example, during off-highway travel, the rear edge of the hood at the corner opposite the lowered wheel will raise as much as four to six inches above the truck cowling, while the opposite rear corner is forced tightly against the cowling. This places tremendous twisting moments on the supporting hinge, or hinges, of the unitary hood and fenders, and on the hood and fender unit itself.

It is a feature of the present invention that the hood and fenders are separated into three pieces, each of which is pivotally mounted to be separately rotated toward the front of the vehicle. Brackets are provided on the hood to engage the fenders during pivoting movement and to prevent independent vibration of the hood and fenders during vehicle travel.

The stresses in the hood and fenders of the present invention are kept to a minimum, because the pieces have independent movement and the rigid span length of each of the pieces is much less than the span length for the corresponding unitary assembly.

The use of separate hood and fenders also allows replacement of one or two damaged pieces to be made without replacing all, should this be required.

There is shown in the accompanying drawing a specific embodiment of the invention representing what is presently regarded as the best mode of carrying out the generic concepts in actual practice. From the detailed description of this presently preferred form of the invention, other more specific objects and features will become apparent.

Figure 2:
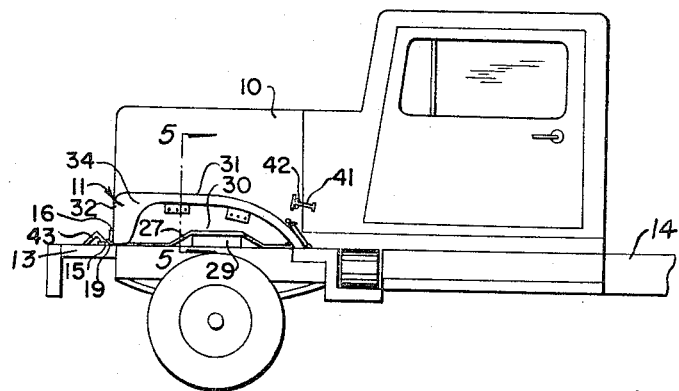
Figure 5:
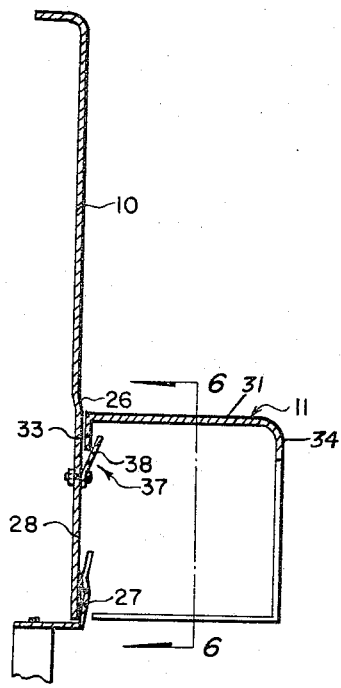
Figure 3:
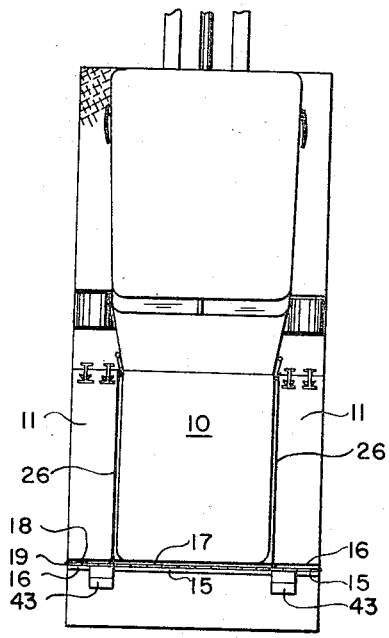
Figure 4:
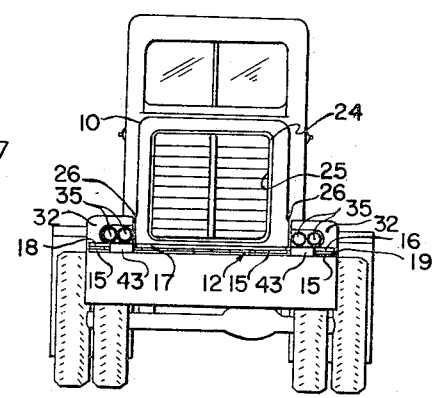

In the drawings:

FIG. 1 is a fragmentary perspective view of a truck equipped with the hood and fender assembly of the invention with the hood and fenders shown in their tipped forward position;

FIG. 2, a fragmentary side elevation, with the hood and fenders shown in their lowered position;

FIG. 3, a fragmentary top plan view;

FIG. 4, a front elevation view;

FIG. 5, a vertical section taken along line 5—5 of FIG. 2; and

Figure 6:
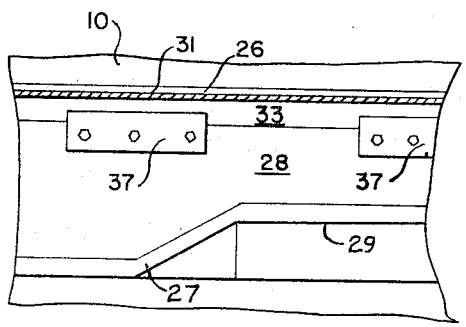

FIG. 6, a vertical section taken along line 6—6 of FIG. 5.

Referring now to the drawings:

The hood and fender assembly of the present invention consists of a central hood 10 and separate flanking fenders 11. A common piano hinge 12 connects the front of the hood and the fenders to a front cross-member 13 of the frame of the truck, shown fragmentarily at 14.

Hinge 12 includes a lower strap 15, fixed to cross-member 13 and extending across the front of the hood and fenders, and three separate upper straps 16–18 fixed to the bottom front edge of the right fender, the hood, and the left fender, respectively. A pin 19 extends the length of strap 15 and passes through matching eyes connected to each of the straps to form the pivot connection.

Hood 10 is of generally box-like configuration; with an open bottom 20 and a rear opening 21 that allows the hood to straddle the usual truck motor and radiator tie rods and to rest flat on the truck cowling 22.

A stiffener 23 surrounds rear opening 21 on the inside of the hood and holds the hood in shape during its pivotal movement. The stiffener is preferably formed integrally with the hood and comprises a rib made of the same material as the hood and covering a box-section form.

Another reinforcing rib 24, comprising an inturned and downwardly depending flange, surrounds a radiator opening 25 in the front of the hood to hold it in shape. Because of its lightweight construction and durability, resin-impregnated fabric of glass fibers has been found to be an excellent construction material for the hood and fenders.

The hood is further strengthened by the formation of a curved ledge 26 at each side of the hood. The ledge extends the length of the hood and follows the top of the fenders, to provide a smooth and pleasant appearing transition from the side wall of the hood to the top surfaces of the fenders.

Longitudinally extending, L-shaped members 27 are provided on both sides of the truck frame at the lowered position of the hood sides 28, such that, as the hood is pivoted to its lowered cowling engaging position, the flared-out bottom edges of the hood sides engage the inside of the upstanding legs of members 27. This arrangement effectively seals off the engine compartment, surrounded by the hood, from the wheel compartments and prevents mud, etc. being thrown by the wheels onto the motor. The inter-engagement of the L-shaped members with the hood sides further stiffens the hood when it is in its lowered position. L-shaped members 27 are centrally raised at 29 to allow the front wheels complete freedom in their vertical movement, and the bottom edges of the hood sides are cut away at 30 to conform to the shape of the L-shaped elements.

The fenders, which are also preferably formed of fiber glass, flank the hood, one at each side. Each fender has a curved top surface 31, a depending front wall 32 that provides a headlight mounting surface, and inner and outer skirts 33 and 34 interconnecting curved top surface 31 and depending front wall 32. Inner skirt 33 extends the full length of top surface 31 and depends therefrom to provide strengthening support.

Outer skirt 34 extends the full length of both top surface 31 and depending front wall 32, and is formed with a wheel opening that allows complete turning of the front wheels. The outer skirt, in interconnecting the top surface and front wall, further strengthens the fender.

To accommodate the usual headlights 35, and their mountings, holes are formed through the front wall 32 of the hood.

A pair of brackets 37 are mounted on each of the hood sides 28 to engage the inner skirt 33 of the corresponding fender. As the hood is pivoted forward, the brackets engage the bottom edge of the inner skirts to pivot the fenders to their raised and tipped forward position. When the hood and fenders are all in their lowered, travel position, the bottom edges of the fenders are positioned within the brackets and are wedged tightly against the hood, thereby reducing independent vibration of the hood and fenders.

The brackets are flared outwardly away from the hood at 38 to guide the inner skirts 33 into wedged position.

A pair of resilient latches 39 are provided on each running board of the truck to securely hold the fenders in their lowered position. Latches 39 engages hooks 40 on the fenders, and similar resilient latches 41 affixed to the vehicle cowling engage hooks 42 on the side of the hood.

In use, it is only necessary to release the latches 39 and 41 before the hood and both fenders can be pivoted toward the front of the vehicle. This allows complete access to any of the vehicle components normally covered by the hood and fenders. In the event only access to the components covered by a fender is desired, it is a simple matter to release the latches 39 of either fender and to pivot it forward to a rest position against a triangular stop 43 having its base mounted on the vehicle frame. Since the hood and fenders are separate units, although interconnected to be mutually reinforcing during vehicle travel and to prevent independent vibrations and noise, destructive twisting moments resulting from racking of the truck are not transmitted through one solid span that effectively magnifies their force in proportion to the distance from the force application. The stresses developing in each of the three individual units are of much smaller magnitude.

Furthermore, should either fender or the hood be damaged, it can be readily replaced without also changing the other components of the hood and fender assembly.

Whereas there is here illustrated and specifically described a cetrain preferred construction of apparatus which is presently regarded as the best mode of carrying out the invention, it should be understood that various changes may be made and other constructions adopted without departing from the inventive subject matter particularly pointed out and claimed herebelow.

We claim:
1. In combination with an automotive vehicle having a frame, a vehicle engine compartment, and wheel compartments,
   a hood and fender assembly including a hood, adapted to straddle the engine compartment and a pair of fenders separate from and flanking said hood;
   pivot means fixed to said frame and forming a pivot axis extending horizontally across the front of the vehicle;
   means connecting the hood and fenders to the pivot means whereby they are each separately pivotable forwardly of the vehicle about the said pivot axis; and
   substantially rigid members fixed to the frame at opposite sides of the engine compartment and extending upwardly and downwardly for substantially the full length thereof, such that when the hood is in its lowered, closed position, covering the engine compartment the sides of the hood fit snug, inside the substantially rigid members and cooperate therewith to provide a seal between the wheel compartments and the engine compartment of the vehicle.
2. The combination of claim 1, further including
   brackets fixed to and flaring outwardly from the hood; and
   a depending wall on each of the fenders, adapted to fit into at least one of the said brackets and to be lifted freely therefrom, whereby pivoting of the said hood when a said depending wall is in its associated brackets will also pivot the said fender.
3. The combination of claim 2, wherein said hood and fenders are constructed of resin-impregnated fiber glass.
4. In combination with an automotive vehicle having a frame, a vehicle engine compartment and wheel compartments
   a hood and fender assembly including a hood adapted to straddle the engine compartment, and a pair of fenders flanking the said hood;
   pivot means fixed to said frame and forming a pivot axis extending horizontally across the front of the vehicle;
   means connecting the hood and fenders to the pivot means whereby they are pivotable forwardly of the vehicle about the said pivot axis; and
   substantially rigid members fixed to the frame at opposite sides of the engine compartment and extending upwardly and outwardly for substantially the full length thereof, such that when the hood is in its lowered, closed position, covering the engine compartment the sides of the hood fit snug, inside the substantially rigid members and cooperate therewith to provide a seal between the wheel compartments and the engine compartment of the vehicle.

References Cited

UNITED STATES PATENTS

| | | | |
|---|---|---|---|
| 2,127,321 | 8/1938 | Barnett | 180—69 |
| 2,197,648 | 4/1940 | Mersheimer | 180—69 |
| 2,699,223 | 1/1955 | Brumbaugh | 180—89 |
| 2,781,102 | 2/1957 | Prichard | 180—69 X |
| 2,868,310 | 1/1959 | Lee | 180—89 |
| 2,936,842 | 5/1960 | Fallin et al. | 180—69 |
| 3,017,944 | 1/1962 | Norrie | 180—69 |

BENJAMIN HERSH, *Primary Examiner.*

MILTON L. SMITH, *Examiner.*